United States Patent [19]

Notter

[11] Patent Number: 5,730,444
[45] Date of Patent: Mar. 24, 1998

[54] SEAL WITH EMBEDDED GARTER SPRING

[75] Inventor: David A. Notter, Lake in the Hills, Ill.

[73] Assignee: SKF USA Inc., Elgin, Ill.

[21] Appl. No.: 613,159

[22] Filed: Mar. 8, 1996

[51] Int. Cl.⁶ .................................................. F16J 15/32
[52] U.S. Cl. ...................................... 277/153; 277/164
[58] Field of Search .............................. 277/134, 152, 277/153, 164, 165

[56] References Cited

U.S. PATENT DOCUMENTS

| | | | |
|---|---|---|---|
| 2,361,348 | 10/1944 | Dickson et al. | 18/30 |
| 2,581,817 | 1/1952 | Simmer | 277/182 |
| 2,949,635 | 8/1960 | Chiero | 18/36 |
| 3,246,369 | 4/1966 | Rhoads et al. | 18/36 |
| 3,561,770 | 2/1971 | Corsi et al. | 277/164 |
| 3,666,852 | 5/1972 | Burke | 264/229 |
| 4,350,347 | 9/1982 | Heinrich | 277/134 |
| 4,381,908 | 5/1983 | Roth | 425/129 R |
| 4,519,567 | 5/1985 | Rautenberg | 249/57 |
| 5,182,032 | 1/1993 | Dickie et al. | 249/91 |
| 5,213,749 | 5/1993 | Huss et al. | 264/275 |

FOREIGN PATENT DOCUMENTS

| | | | |
|---|---|---|---|
| 1223641 | 8/1966 | Germany | 277/153 |
| 150659 | 11/1981 | Japan | 277/152 |
| 187656 | 11/1983 | Japan | 277/153 |

*Primary Examiner*—Daniel G. DePumpo
*Attorney, Agent, or Firm*—James T. FitzGibbon

[57] ABSTRACT

A fluid seal including a casing unit and an elastomeric lip body portion. Frustoconical air and oil side surfaces of the lip body meet at an inner diameter portion to form a fluid seal band contacting an associated shaft in use. A continuous, circumferentially extending garter spring is embedded in the seal lip body. An axially inner surface of the lip body is defined in part by plural spaced apart ribs and the remainder is defined by pockets having portions lying closely adjacent the radially and axially innermost portions of the garter spring. In the free state of said seal, the garter spring exerts a radially inwardly directed preload force so as to resist radial expansion of said seal. The spring also resists dimensional shrinkage of the seal band and the remainder of the seal body.

3 Claims, 3 Drawing Sheets

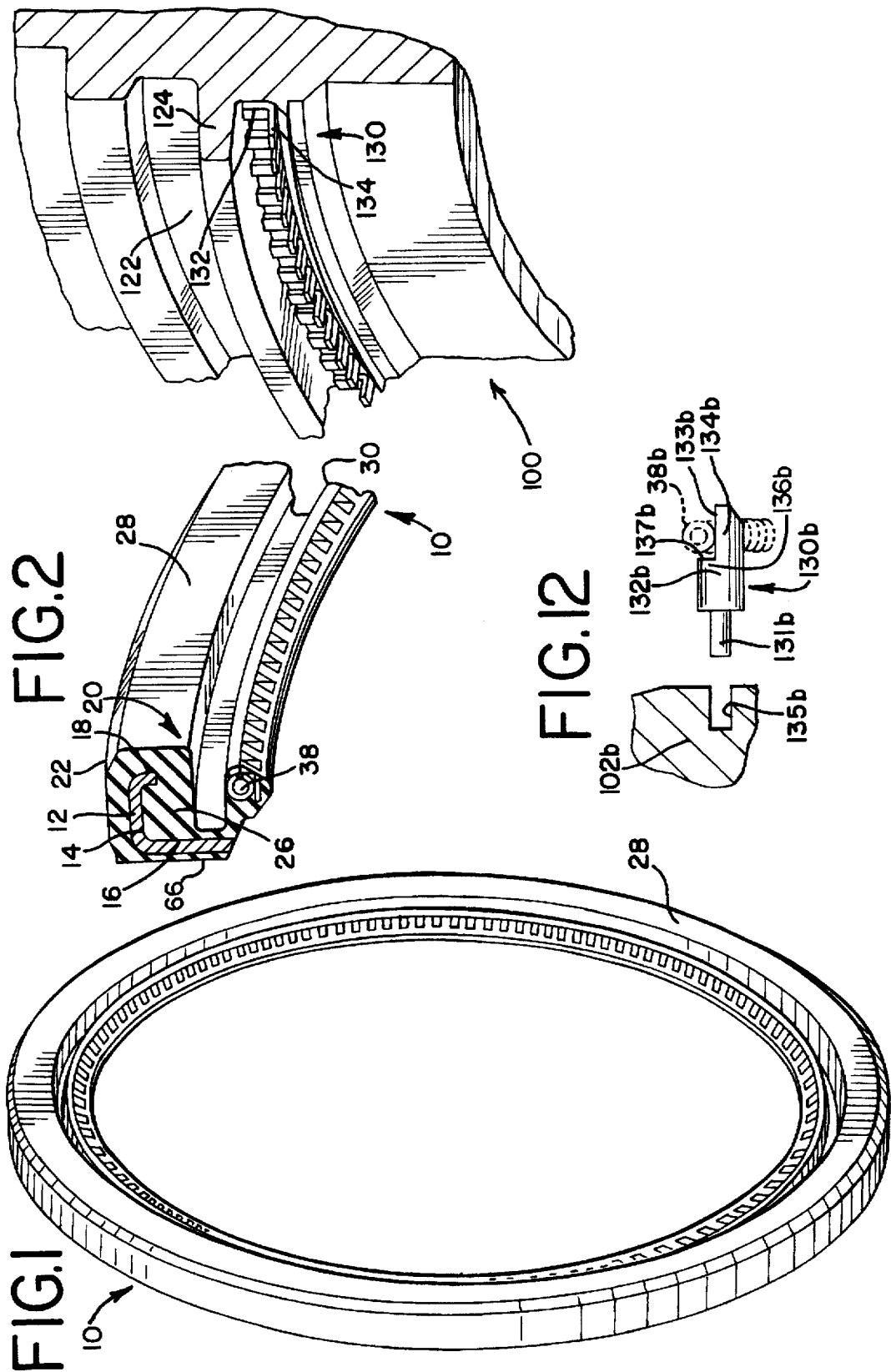

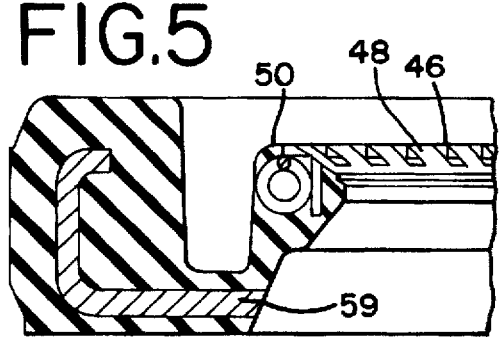
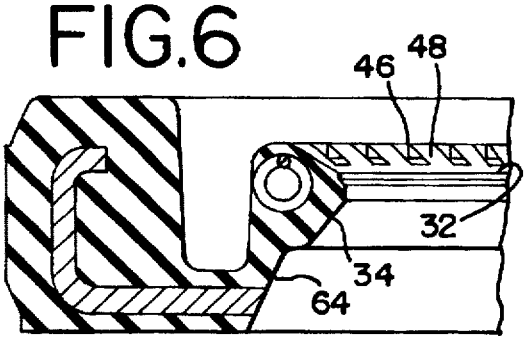
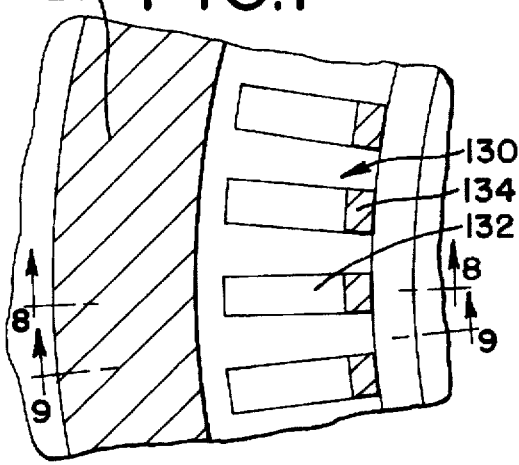
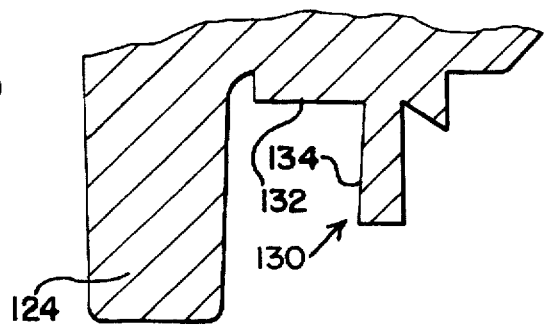
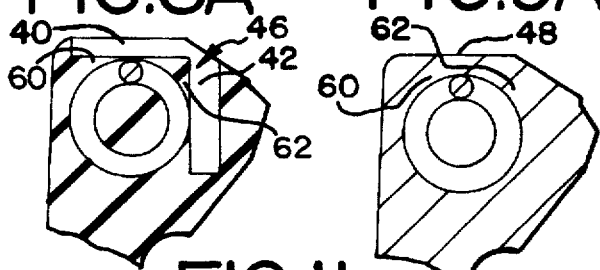
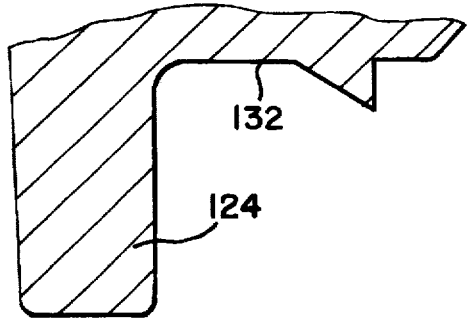
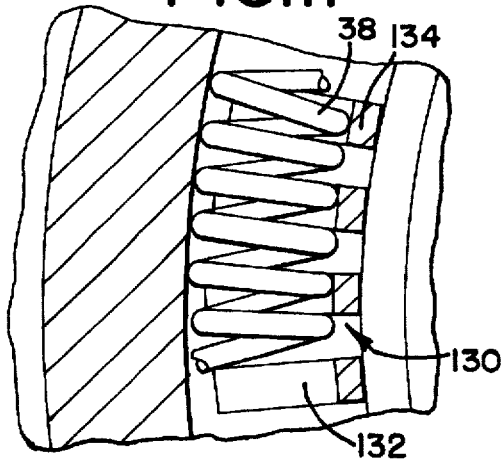
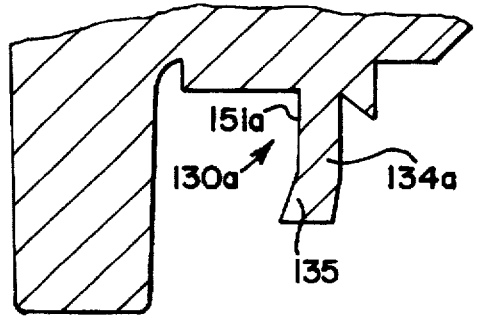

5,730,444

SEAL WITH EMBEDDED GARTER SPRING

BACKGROUND OF THE INVENTION

The present invention relates generally to fluid seals, and more particularly, to improved methods and apparatus for manufacturing particular kinds of fluid seals. Specifically, the invention pertains to methods and apparatus for overcoming prior problems with seals having so-called embedded garter springs within the lip body portions of what are termed composite fluid seals. By "composite seal" is meant a seal having a casing or stiffening portion as well as an elastomeric portion which includes (but is not limited to) an elastomeric seal lip body. In some preferred designs, the rubber also surrounds and encases the entire seal casing to provide a rubber outside diameter and a pair of opposed rubber end faces.

In most seal designs, it is customary for a so-called garter spring to be provided in order to augment the radial load provided by the innate resiliency of the seal lip. The spring is normally positioned in a groove molded into the lip body, radially outwardly of the seal band area. In certain seals, depending upon the application, and the installation process, there has commonly been difficulty with the garter springs "popping out" or separating from the remainder of the seal. This problem has been addressed in a number of ways, some of which are generally satisfactory and others of which have led to still other drawbacks.

It has been suggested that additional auxiliary flanges or the like be provided for this purpose, but this sometimes requires an extra part or additional manufacturing operations. In addition, such a solution can often make initial positioning of the garter spring difficult and time consuming, thus sacrificing the desired feature of simplicity. It has also been proposed to alter the shape of the spring groove so as to provide a lip portion with greatly increased overhang in the spring groove area to minimize a likelihood that the garter spring will undesirably pop out of its intended position of use. However, such designs often call for a rather large overhang or undercut in the finished product, and this in turn renders molding and product removal problematical or difficult. Accordingly, such solutions have not always achieved their hoped-for advantages.

Still further, it has been suggested that the garter spring could be embedded within the seal body in order to make certain that it does not escape from its intended position. This solution has the advantage of certainty that the garter spring cannot escape. However, the various approaches to positioning a garter spring within the mold has led to erratic and often unsatisfactory results in use. For example, in some instances, it was suggested that the garter spring simply be formed and dropped into the molding cavity without conscious positioning except that created by relative sizes and shapes of the mold parts and the size of the spring itself. This approach has not proved satisfactory inasmuch as the springs have sometimes had a tendency to reposition themselves in reaction to the high forces created during molding. The fluent rubber may displace the garter spring from its intended position of use, resulting in a spring that is embedded eccentrically relative to the seal inside diameter.

Still further, in certain prior designs, it has been found that the embedded spring tends to be positioned in such a way that its effectiveness is compromised. Thus, if the spring uses its own inherent resistance to compression in order to be positioned, then it will normally lie in a corner of the closed mold. This positioning may not be desirable, for a number of reasons. Among these are that, if for design reasons, it is desired to move the spring within the body of the rubber, this is difficult or impossible where the spring inherently biases itself towards a corner or outer diameter surface of the mold. Accordingly, while there are postulated advantages to utilizing a garter spring which is embedded in the seal body, the prior designs and methods have not been entirely satisfactory.

According to the present invention, it is possible to provide a spring positioner that will enable a designer to precisely position a garter spring in relation to the mold cavity. Thus, the spring will assume a desired position in the finished product.

Further, according to the present invention, a properly positioned spring can be used to achieve the advantages of making what are in effect different sizes of seals in the same seal mold. Thus, for example, when an ordinary seal of the type having a spring groove is manufactured, after the rubber has been cured and bonded to the casing, the inside diameter of the seal lip commonly shrinks a considerable amount, such as, for example, 0.060 inches on a 3 inch seal. On larger diameter seals, depending on the seal cross section, the shrinkage can be proportionately greater. The so-called residual interference or molded interference which determines the initial radial load of the seal is simply the difference in diameters respectively of the shaft or other part to be sealed and the inside diameter of the seal itself. The radial load increases as the diameter of the sealed part increases, whether this increase is intentional or merely because of tolerance variation.

An ideal oil seal is one that has a controllable radial load, i.e., one which is sufficient to afford sealing but is not so great as to cause excess friction and wear. It has been found that it is possible to restrict or reduce the shrinkage of the seal inside diameter (i.d.) if a garter spring is embedded in the seal body within an appropriate distance from the seal band. Likewise, it has been discovered that, by preloading the garter spring by placing it in tension as positioned, it is possible not only to place the spring where desired, but also, by varying the preload, the spring diameter, and the size of spring wire, the radial load characteristics of the seal as a whole can be controlled.

A consequence of this is that the same mold can be used to produce seals having different as molded inside diameters and different variations in preload with residual interference.

Because the cost of making different molds for each of a number of slightly different sizes is prohibitive in large diameter seals, the method and apparatus of the invention can provide seals which will fit a number of different applications without the expense of new mold manufacture.

Consequently, in view of the failure of the prior art to provide an optimized embedded garter spring design for radial lip seals, it is an object of the present invention to provide an improved seal of the embedded spring type.

Another object of the invention is to provide an apparatus and method for making improved embedded garter spring type seals.

Yet another object of the invention is to provide a mold for oil seal manufacture wherein the mold includes a spring positioner comprised of a plurality of spaced apart fingers constructed and arranged so as to precisely position the spring during molding.

A still further object of the invention is to provide a mold for oil seal manufacture wherein at least one mold part includes a spring positioning portion comprised of a plurality of fingers adapted to create pockets in the finished product wherein the embedded spring is only superficially surrounded by a web or covering of rubber, while leaving other portions between the pockets or spaces wherein the spring is surrounded by a mass of rubber.

An additional object of the invention is to provide an oil seal wherein the elastomeric lip body includes air and oil side surfaces and an axially inner surface composed of a substantially continuous generally planar end face portion having a large plurality of spaced apart pockets therein, each of the pockets providing a region wherein the spring is not surrounded by a solid mass of rubber and also providing a large number of regions wherein the spring is substantially fully surrounded.

A still further object of the invention is to provide a method of making seals which includes positioning and pre-tensioning a garter spring in a mold cavity using an array of fingers laid out in a precise way, and then filling the cavity with fluid rubber while retaining the spring in its desired position.

Another object of the invention is to provide a mold which will facilitate easy manufacture of embedded spring type seals, and from which the seals may be removed with little or no difficulty.

A further object of the invention is to provide a mold which is capable of producing seals of different molded inside diameters and different radial load characteristics merely by changing the preload on an inserted garter spring or by changing the wire size and coil diameter of the garter spring material.

A still further object of the invention is to provide a method of mold manufacture which permits spring positioners to be made in a variety of ways.

Yet another object of the invention is to provide a method wherein the initial size and radial load characteristics of an oil seal are controlled by varying the assembled inside diameter of the garter spring as a method of adjusting its tension or preload prior to product manufacture.

An additional object of the invention is to provide a mold design wherein the spring positioners may be made in a variety of simple configurations, all of which are easy to manufacture.

The foregoing and other objects and advantages of the invention are achieved in practice by providing an oil seal having a casing and an elastomeric portion including a portion forming an elastomeric seal lip body, a garter spring embedded in the body and positioned radially outwardly of the pair of frustoconical surfaces meeting to define a seal band, with the garter spring being surrounded in part by rubber ribs and in part by thin walled pockets formed in the seal lip body and thus minimally surrounding parts of the spring, with such seal having reduced post-molding shrinkage and modified radial load characteristics.

The invention also achieves its objects by providing a mold having one mold half that includes portions adapted to form one part of the seal lip body including the frustoconical air and oil side surfaces meeting to form a seal band and other portions adapted to position and support a garter spring, such portions including plural spaced apart fingers extending into the molding cavity.

Still further, the invention achieves its objects by providing a method of seal manufacture which includes prepositioning and tensioning a garter spring within the seal mold and thereafter filling the molding cavity with fluent, curable elastomer to form a seal with an at least partially embedded garter spring having desired properties of flexure and memory.

The manner in which the foregoing and other objects and advantages of the invention are achieved in practice will become more clearly apparent when reference is made to the following detailed description of the preferred embodiments of the invention set forth by way of example and shown in the accompanying drawings, in which like reference numbers indicate corresponding parts throughout.

BRIEF DESCRIPTION OF THE DRAWINGS

FIG. 1 is a perspective view of a seal made according to the present invention;

FIG. 2 is a greatly enlarged fragmentary perspective view, partially diagrammatic in character, showing a portion of the seal of FIG. 1 positioned adjacent a portion of a mold in which the seal was made;

FIG. 5 is a vertical sectional view of one portion of the seal of the invention;

FIG. 6 is a vertical sectional view of another portion of the seal of the invention;

FIG. 7 is an end elevational view of a portion of the mold used to form the seal of the invention, taken along lines 7—7 of FIG. 4;

FIG. 8 is a fragmentary enlarged sectional view of a portion of the mold of the invention, taken along lines 8—8 of FIG. 7;

FIG. 8A is a partially diagrammatic sectional view of the seal of the invention made using the portion of the seal mold illustrated in FIG. 8;

FIG. 9 is a fragmentary sectional view of a portion of the mold of the invention taken along lines 9—9 of FIG. 7;

FIG. 9A is a partially diagrammatic sectional view of a portion of a seal made from the portion of the mold shown in FIG. 9;

FIG. 10 is a sectional view of a modified form of spring positioner of the invention;

FIG. 11 is a view similar to that of FIG. 7, but showing a garter spring positioned by the fingers and under initial tension or preload; and FIG. 12 is a partially diagrammatic view showing a modified form of spring positioner useful with the invention.

DESCRIPTION OF THE PREFERRED EMBODIMENTS OF THE INVENTION

Figure 3:
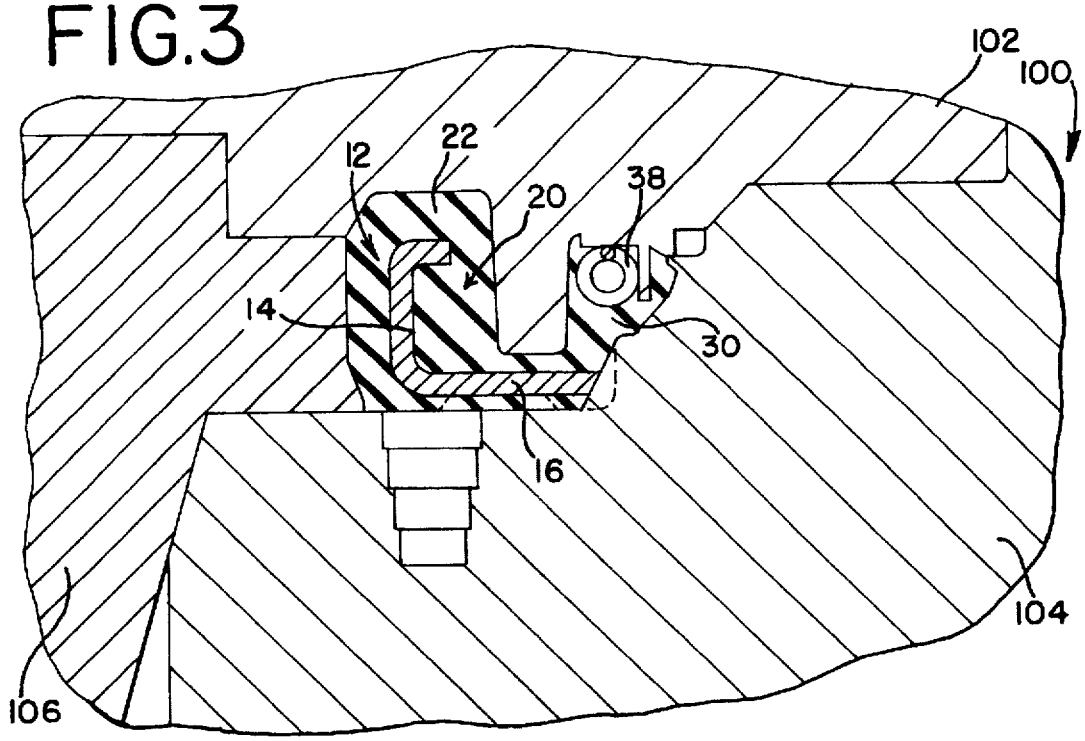
FIG. 3 is a further enlarged vertical sectional view of a portion of the seal of the apparatus and the mold in which the seal is made.

While the invention may be practiced in different ways and the oil seal product made by the inventive process may vary in constructional details, a description will be given of a preferred form of seal and one or more presently preferred forms of molding apparatus used to produce the seal.

Referring now to the drawings in greater detail, and in particularly to FIGS. 1–4, there is shown a seal assembly generally designated 10 and shown to include a steel or like rigid casing portion generally designated 12 and shown to comprise an axial flange 14, a radial flange 16, an optional end curl 18 which may be made from a reduced thickness of casing material. The casing portion 12 is almost entirely surrounded by a body generally designated 20 of an elastomeric material. The elastomeric body includes an annular outside diameter covering portion 22 that provides an exterior mounting surface 24. The body 20 also includes an annular, axial flange inner surface cover portion 26 with the surfaces 24, 26 being joined by an axially inner end face surface 28.

According to the invention, a circumferentially extending garter spring 38 is embedded with a seal lip body 30. The garter spring 38 is preferably in the form of a circumferentially extending endless coil spring having a radially outermost surface which in part is covered by a thin web of rubber and which in other places is encased by rubber of relatively thick cross section.

The seal lip body 30 is shown to be defined in part by a frustoconical oil side surface 32, and a frustoconical air side surface 34, with these surfaces meeting along a sharp edge to form a seal band 36 of intended contact with an associated machine member such as a rotary shaft (not shown) or the like. The seal lip body 30 also preferably includes a continuous radially outer surface 39, and a plurality of closely spaced apart, generally radially extending spring positioner entry surfaces 40, and a plurality of closely spaced apart, axially extending spring positioner entry surfaces 42.

According to the invention, the spring positioner entry surfaces 40, 42 create a plurality of L-shaped pockets generally designated 46 in the lip body 30 with each pocket 46 being separated from an adjacent pocket 46 by an adjacent rib 48. The pockets 46 are open in axially facing relation to the oil side of the seal, and the ribs extend generally radially between the radially outer spring positioner entry surface 40 and the beginning of the oil side surface 32, such ribs collectively forming the axially inner end face 50 of the lip body 30. By "axially inner" is meant towards the oil side or sealed region and by "axially outer" is meant towards the air side or away from the sealed region.

By comparing and contrasting FIGS. 8A and 9A, for example, it can be appreciated that where the pockets 46 are formed, the rubber covering for the garter spring is minimal, i.e., there is a thin cover of rubber 60 over the axially innermost part of the garter spring 38, and an equally thin rubber cover 62 over the radially innermost portion of the spring 38. However, referring to FIG. 9A, it will be seen that the coverings 60 and 62 comprise a more substantial, thicker mass of elastomer. This is because, in this part of the seal, there are ribs 48 extending between and joining the surfaces 32, 40. On the other hand, the coverings are thin where the pockets 46 are formed.

Referring again to FIGS. 2-6, for example, it is shown that the seal lip body 30 that is defined by the various surfaces 32, 34, 40, 50 is joined to the radially innermost portion 59 of the casing radial flange 18 by a flex section 64. In the form of seal shown in FIG. 4, the casing radial flange is also covered by a rubber outer end face cover 66 having spaced apart notches 68 therein.

Figure 4:
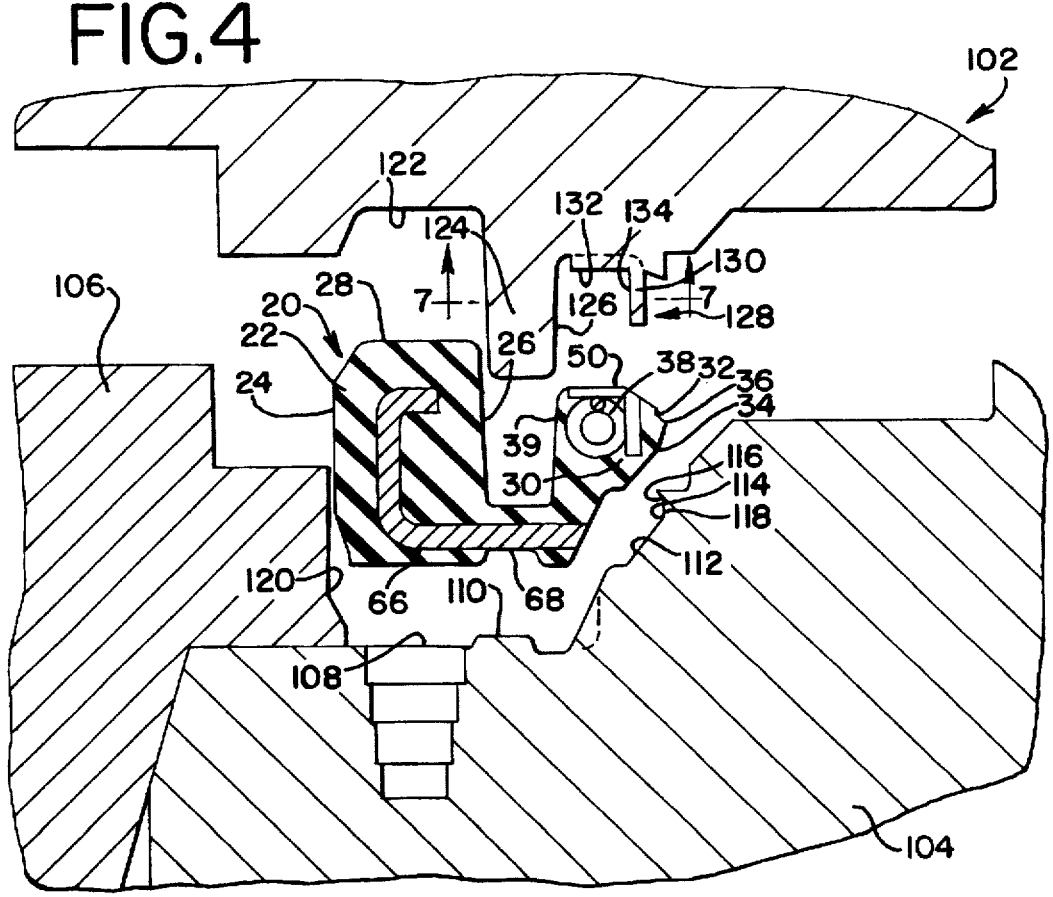
FIG. 4 is a vertical sectional view of a portion of the seal and mold of FIG. 3, showing the mold in the open position and the seal partially removed therefrom.

Referring now to FIGS. 3 and 4, there is somewhat schematically illustrated a mold in which seals according to the invention can be made when certain of the inventive steps to be described are carried out. Thus, referring to FIGS. 2 and 3, for example, there is shown a mold assembly generally designated 100, and shown to include an upper insert portion generally designated 102, a lower or core portion generally designated 104, and an outer ring portion generally designated 106. When completely closed, as shown in FIG. 3, the various parts of the mold assembly 100 will form a cavity in which the seal is formed by substantially surrounding the casing 12 with a body of elastomer 20.

According to the invention, it is desired to construct a mold as shown in FIGS. 3 and 4, for example. Here, the lower mold core 104 includes an annular end face forming surface 108 having circumferentially spaced apart bosses 110 adapted to form the notches 68 in the outer end face cover 66 of the seal. The lower mold core 104 also includes an angled, inclined surface 112, a portion of which will form one surface of the flex section 46 connecting the lip body 30 to the radial flange 18. A generally frustoconical surface 114 forms the air side surface 34 of the seal, a portion of another frustoconical surface 116 forms a part of the oil side surface 32 of the lip body 30 and these surfaces meet at a sharp circumferentially extending, seal band-forming notch 118. The ring portion 106 of the mold 100 includes a radially outermost contoured surface portion 120 which will form the exterior mounting surface 24 on the finished seal.

An important part of the mold assembly 100 is the top insert 102 which includes an annular surface 122 adapted to form the axially inner end face surface 28 of the seal and a large circumferential land 124, the radially inner portion 126 of which forms the radially outer spring cover surface 39 in the finished seal.

FIGS. 2 and 4 show that a spring positioner generally designated 128 is made up of a plurality of circumferentially spaced apart, generally L-shaped fingers 130, each of which preferably includes a radial leg 132 and an axial leg 134 for contacting and supporting the facing portions of the garter spring 38. Each leg 132, 134 of the finger 130 is about equal in length to the diameter of the coil in the spring 38.

In one embodiment, a large diameter seal, the legs 132, 134 of each finger 130 were about 0.230 to about 0.250 inches in length, with the fingers being about 0.10 inches wide (circumferential) and with the ribs being about an equal width. Thus, for every circumferential inch of seal size, there would be, in one embodiment, approximately five pockets and five ribs.

Referring again to FIG. 2 and also to FIG. 9A, where these fingers 130 are absent from the mold insert 102, flat surfaces 48, 50 are present the fingers 130 forming the radial portions of the lip body 30 are present, there will be notches 46 in the finished seal, and where the fingers 130 are absent, there will be ribs 48 in the finished product. In a large diameter seal, such as one having an outside diameter of 23 inches, for example, there will be several hundred ribs and pockets in each seal, assuming, as pointed out, that the ribs and pockets are each approximately 0.100 inches wide.

Referring now to the inventive method, a garter spring 38 is assembled from coil spring stock cut to the proper length and joined so as to comprise a substantially endless hoop spring. This spring is then positioned over the fingers 130 in the mold 100 and retained in place over the fingers by its own innate resiliency. The mold halves 102, 104 are then closed with the spring 38 so positioned and the fluent rubber is forced into the molding cavity defined by the mold surfaces just described.

Upon curing, the finished seal product thus contains a seal with a rubber outside diameter and a spring which is covered entirely or almost entirely by rubber. However, some portions of the spring are covered by only a very thin web of rubber such that, in some cases, the contour of the spring may be seen through the residual web of material. Other parts of the spring are covered by a rubber in the form of the ribs 48.

Referring again to the practice of the inventive method, and particularly to the behavior of the seal in relation to the selection and positioning of garter springs, a seal was manufactured for experimental purposes which was similar to that shown in FIG. 10 except that no embedded garter spring was used. In the tooling for making this specimen seal, the lip-forming surfaces of the cavity had an inside diameter of 3.000 inches. In the free state, a seal made in this mold and having no spring demonstrated lip shrinkage down to a diameter of 2.929 inches, or a shrinkage of about 0.071 inches. Subsequently, an otherwise identical seal was made using a mold such as that shown in FIGS. 2 and 11. A garter spring 38 was formed into a continuous loop and its assembled inside diameter ("AID") measured. The garter spring was positioned as shown in FIG. 11, i.e., it was retained under spring tension on the axial legs 134 of the fingers 130. Subsequently, additional seals were made using garter springs 38 that were otherwise identical but included assembled inside diameters differing by each other by 0.020 inches. In all cases, the springs displayed at least some tension or preload relative to the mold fingers.

In measuring the resultant seals, it was determined that the initial shrinkage was reduced in all cases where a garter spring was used, even where the spring that was provided had the effect of increasing the radial stiffness of the seal. Seals using springs with the smallest assembled inner diameters (and hence the largest preload) demonstrated more shrinkage than those with less preload. However, the presence of an embedded spring, even a preloaded spring, resulted in a seal having a larger free state inside diameter than a seal having no spring. Utilizing a 3 inch diameter seal by way of example, it was determined that the inside diameter of the seal could be made to vary from about 2.929 inches up to about exactly 3.00 inches, merely by the presence or absence of a spring and the difference in the preload applied to the spring.

Tests of radial load, which is proportional to the stiffness of the seal in the radial direction, as well as to the initial or molded interference, showed that considerable variations in radial load could be attained. For this purpose, test shafts were made having a diameter of exactly 3.00 inches. Additional test shafts were also made, each larger than the other by 0.020 inches. It was thus determined that, using a spring of the same wire diameter and size and merely altering the preload or AID, it was possible to create a wide variety of radial load variations. Some seals developed a radial load of less than 1 ounce per inch of shaft circumference while others displayed values in excess of 32 ounces per inch of shaft circumference. The variation in as-molded inner diameters with and without springs aggregated almost 0.070 inches in a 3-inch diameter seal. The effect of the spring presence was noted in that a seal with no spring and a nominal 0.070 inches of molded interference displayed only half of the radial load of a seal which was 0.035 inches larger but which included a garter spring. The radial load of a seal having no spring and 0.70 interference was approximately the same of a seal with a spring and only 0.010 inches of interference. The radial load increased much more sharply with an increase in test shaft diameter where the spring was present. Thus, the radial load enhancing capability of the spring could be taken advantage of, while the preload placed on the spring during manufacture could be used to initially size the seal to its desired dimension. In large diameter seals, such as those used in a so-called roll necks of steel mills, seals of 20 inches or much more in diameter require expensive tooling to produce. In this area, instead of needing an entirely new mold to achieve a small change in dimension, a significant variation in as-molded seal sizes can be achieved simply by changing the AID of an embedded garter spring that is properly positioned within the seal lip body.

Forming seals of the kind just described has proved to be advantageous in several respects. For example, in a seal design wherein seals of the same size may be called upon, because of the application, to provide for different radial loads, the degree of preload may be varied according to the wishes of the engineer. The inventive spring provides not only resistance to outward deformation as does a conventional garter spring, but also provides resistance to rubber shrinkage occasioned during seal formation. Thus, given a particular mold, it is possible to utilize springs of different assembled inner diameters and hence during initial preload, to control the out-of-the-mold shrinkage. Thus, using an identical mold and three different springs, each of a different assembled inner diameter (AID), it was possible to vary the size of the seal i.d. as it came from the mold. Seals of different sizes would then display an initial size difference or so-called molded interference between their seal band areas and the outer diameter surface of an associated shaft. Further, when the seals are installed in application, the behavior of the seal can be determined in advance.

In the illustrated embodiments, a mold insert was made wherein the spring positioner comprised a plurality of individual fingers 130 that were formed into a ring having plural fingers extending outwardly therefrom to engage the inside diameter of the spring and position it as desired. However, and referring now to FIG. 12, the invention may also be practiced by inserting individual pins 130b to be used as fingers, with each pin including, by way of example, a cylindrical shank 131b and a flattened portion 133b intended to face radially outward for engagement with a garter spring 38b. The mold insert 102b includes a shank-receiving opening 135b for the shank 131b. In effect, the flattened surface 133b and the radial surface 137b form counterparts 134B, 136b to the legs of the positioner in the other embodiments.

In some embodiments, it may be necessary to have a reverse draft or slant to certain finger surfaces. Thus, referring now to FIG. 10, such a construction is shown. Here, the innermost tip 135 of the leg 134a is of slightly larger diameter than the surface 151a. This will serve to retain the spring in place during seal formation but the amount of reverse draft or undercut will not impede removing the fingers from the seal when the finished product is taken from the mold. Likewise, the entire spring-engaging surface of the leg 134 in FIG. 8 may be slightly inclined rather than being constructed as shown in FIG. 10.

Referring again to the seal mold, and particularly the top insert 102, the preferred method of making the fingers 130 is simple and economical. Here, the mold is initially constructed with the annular surfaces being provided such that the entire cross section of the mold appears to be that of FIG. 8, i.e., instead of individual fingers, there is a continuous ridge or land extending into the molding cavity. After the land is formed in this way, a plurality of radial cuts are made flush with an end face surface of the mold, thus converting a single continuous land into a plurality of individual fingers. In the embodiment of FIG. 12, such steps are not necessary, as this involves simply placing a series of holes in a mold end face and pressing the shanks of the pins that support the spring into the openings that are arranged about a circular locus.

It will thus be seen the present invention provides a new and improved seal with embedded garter spring having a number of advantages and characteristics including those expressly pointed out here, and others which are inherent in the invention. Several preferred embodiments having been described by way of illustration, it is anticipated that variations to the described form of method and apparatus will occur to those skilled in the art and that such modification and changes may be made without departing from the spirit of the invention or the scope of the appended claims.

I claim:

1. A fluid seal assembly comprising, in combination, a casing unit having axial and radial flanges, and an elastomeric lip body portion comprising frustoconical air and oil side surfaces meeting at an inner diameter portion so as to form a fluid seal band contacting an associated shaft in use, a continuous, circumferentially extending garter spring embedded in said lip body, an axially inner surface of said lip body defined in part by plural spaced apart ribs and the remainder being defined by pockets of generally L-shaped configuration, having portions lying closely adjacent the radially and axially innermost portions of said garter spring, said lip body portion being joined to a radially inner portion of said casing radial flange by a flexible neck section of thin radial cross section, said garter spring, in the free state of said seal, exerting an radially inwardly directed preload force so as to resist radial expansion of said seal and the elastomeric material comprising said lip body acting radially inwardly on said spring to place said spring under a radial compressive load, said spring also resisting dimensional shrinkage of said seal band.

2. A fluid seal assembly as defined in claim 1, wherein said casing axial flange is covered by a cylindrical rubber formation providing a radially outwardly directed cylindrical mounting surface.

3. A fluid seal assembly as defined in claim 1, wherein said entire casing is substantially completely surrounded by the same elastomeric material comprising said lip body portion.

* * * * *

UNITED STATES PATENT AND TRADEMARK OFFICE
CERTIFICATE OF CORRECTION

PATENT NO. : 5,730,444
DATED : March 24, 1998
INVENTOR(S) : David A. Notter

It is certified that error appears in the above-identified patent and that said Letters Patent is hereby corrected as shown below:

Col. 6, lines 36-37, should read

-- annular, flat surfaces 48, 50 are present. Thus, where the fingers 130 forming the radial portions --

Signed and Sealed this

Ninth Day of November, 1999

Attest:

Q. TODD DICKINSON

Attesting Officer

Acting Commissioner of Patents and Trademarks